(12) United States Patent
Starbuck

(10) Patent No.: US 12,247,600 B2
(45) Date of Patent: Mar. 11, 2025

(54) SWAGED FASTENERS

(71) Applicant: STAR FASTENERS (UK) LIMITED, Nottingham (GB)

(72) Inventor: Daniel Ian Starbuck, Nottingham (GB)

(73) Assignee: STAR FASTENERS LIMITED (GB)

( * ) Notice: Subject to any disclaimer, the term of this patent is extended or adjusted under 35 U.S.C. 154(b) by 497 days.

(21) Appl. No.: 17/602,626

(22) PCT Filed: Apr. 9, 2020

(86) PCT No.: PCT/EP2020/060298
§ 371 (c)(1),
(2) Date: Oct. 8, 2021

(87) PCT Pub. No.: WO2020/208215
PCT Pub. Date: Oct. 15, 2020

(65) Prior Publication Data
US 2022/0196045 A1    Jun. 23, 2022

(30) Foreign Application Priority Data
Apr. 9, 2019 (GB) .................................... 1905043

(51) Int. Cl.
*F16B 19/05*    (2006.01)
*F16B 31/02*    (2006.01)

(52) U.S. Cl.
CPC .............. *F16B 19/05* (2013.01); *F16B 31/02* (2013.01); *F16B 2200/95* (2023.08)

(58) Field of Classification Search
CPC .............................. F16B 19/05; F16B 2200/95
(Continued)

(56) References Cited

U.S. PATENT DOCUMENTS 2,824,481 A    2/1958  Johnson
3,918,160 A  * 11/1975 Friedman ............... A61C 19/05
                                                      433/214
(Continued)

FOREIGN PATENT DOCUMENTS

JP    H03117714 A    5/1991
JP    2000230530 A   8/2000
(Continued)

OTHER PUBLICATIONS

International Search Report for International application No. PCT/EP2020/060298 dated Feb. 19, 2009 from the European Patent Office.

(Continued)

*Primary Examiner* — Flemming Saether
(74) *Attorney, Agent, or Firm* — Keusey & Associates, P.C.

(57) ABSTRACT

A swaged fastener (10) includes a coated collar (12) for location in use on a pin (14). In an unswaged condition, the coated collar (12) comprises a substrate material (16) having a substrate colour and an indicator material (20) having an indicator colour. The indicator material (20) is located on the substrate material (16). The indicator colour is visually different to the substrate colour. The coated collar (12) includes a swaging surface (18) to which, in use, a swaging force is applied to move the collar (12) from the unswaged condition to a swaged condition. The indicator material (20) comprises at least part of the swaging surface (18) and is arranged so that, in a correctly swaged condition, the indicator material (20) comprising the swaging surface (18) is substantially removed to expose the substrate colour and thereby provide a visual indication that the swaging process has been correctly carried out.

22 Claims, 2 Drawing Sheets

(58) Field of Classification Search
USPC .................................................. 411/361, 13
See application file for complete search history.

(56) References Cited

U.S. PATENT DOCUMENTS

| | | | | |
|---|---|---|---|---|
| 3,935,960 | A * | 2/1976 | Cornell | G09F 3/0292 |
| | | | | 206/460 |
| 6,609,865 | B2 * | 8/2003 | Daigneault | F16B 31/028 |
| | | | | 411/13 |
| 7,465,234 | B2 * | 12/2008 | Keener | B21K 1/56 |
| | | | | 72/46 |
| 7,703,669 | B2 * | 4/2010 | Amirehteshami | B25B 13/56 |
| | | | | 235/375 |
| 8,092,128 | B1 * | 1/2012 | Bray | F16B 19/008 |
| | | | | 411/82 |
| 9,046,119 | B2 * | 6/2015 | Choi | B25C 1/005 |
| 9,671,315 | B2 * | 6/2017 | Smith | B25B 13/065 |
| 2001/0041111 | A1 * | 11/2001 | Smith | F16B 5/00 |
| | | | | 411/394 |
| 2004/0029316 | A1 | 2/2004 | Schnegg et al. | |
| 2008/0297343 | A1 | 12/2008 | Smith et al. | |
| 2012/0213610 | A1 * | 8/2012 | Guerin | F16B 5/02 |
| | | | | 411/378 |

FOREIGN PATENT DOCUMENTS

| | | |
|---|---|---|
| JP | 2001208032 A | 3/2001 |
| WO | 2009023685 A2 | 2/2009 |

OTHER PUBLICATIONS

Written Opinion for International application No. PCT/EP2020/060298 from the European Patent Office.
International Search Report for International application No. PCT/EP202/060298 dated Feb. 19, 2009 from the European Patent Office.

* cited by examiner

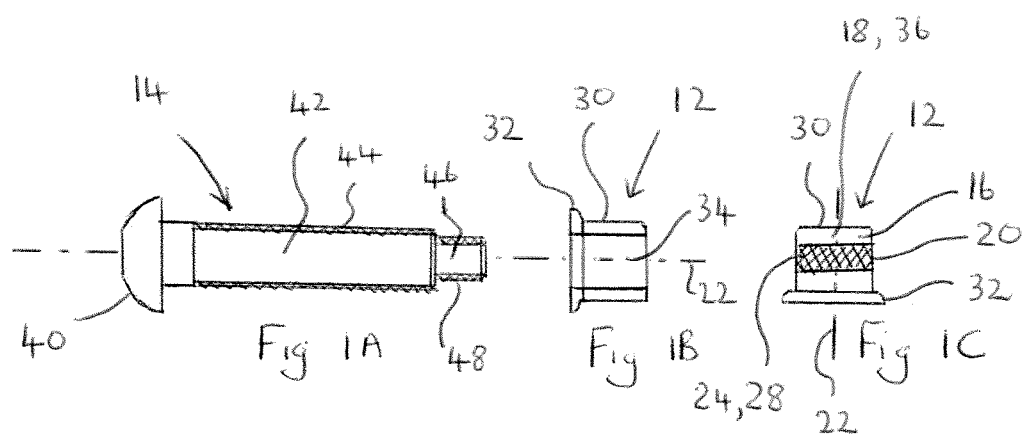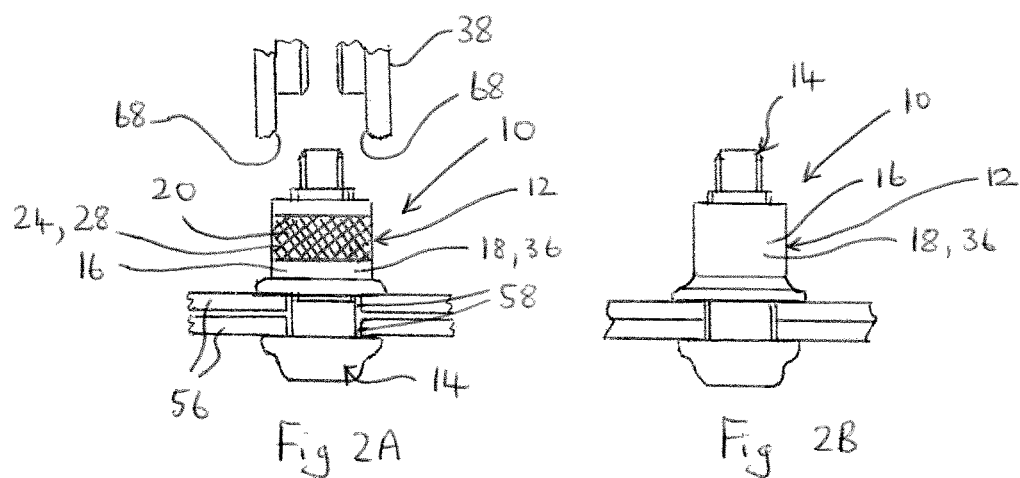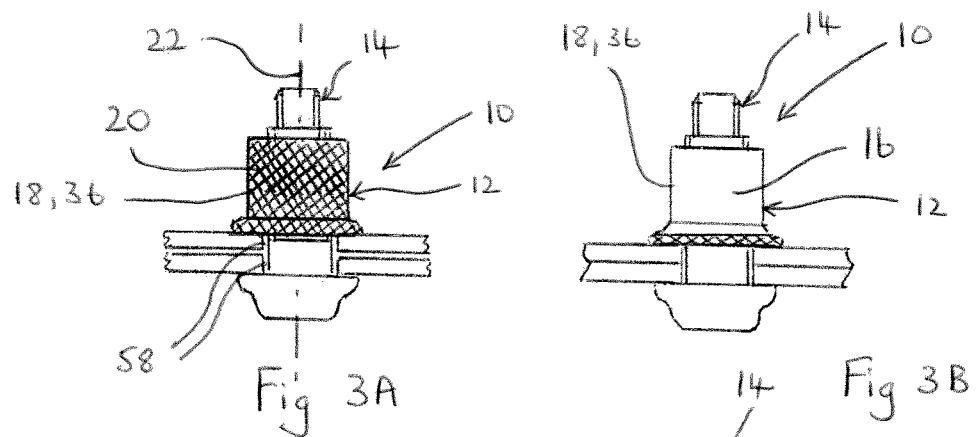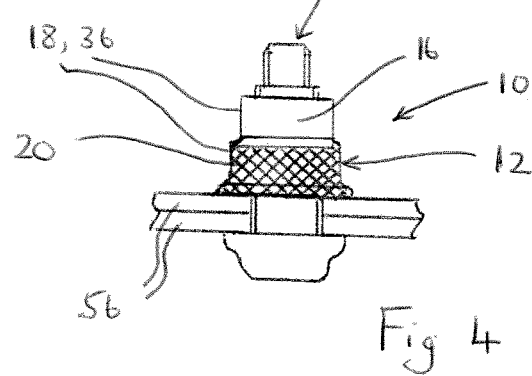

SWAGED FASTENERS

BACKGROUND OF THE INVENTION

1. Field of the Invention

The present invention relates to swaged fasteners.

2. The Prior Art

Conventionally, a swaged fastener comprises a pin and a collar which are fastened together by swaging, in which a swaging tool is used to apply a swaging force to compress the collar into groove formations on the pin. This fastening method is fast, relatively clean and low risk and can be undertaken by relatively low skilled operatives with hand tools and is increasingly replacing traditional threaded methods like nuts and bolts and more skilled, inherently risky and difficult methods such as welding.

In a common type of swaged fastener, the pin is referred to as a lockbolt.

In some fabricated assemblies, a plurality (sometimes comprising many tens or even hundreds) of the pins are first placed in situ, with all of the collars located on the pins without swaging. An operative with a swaging tool then swages the collars onto the pins. However, in such assemblies, it can be difficult to distinguish between an unswaged collar and a swaged collar, with a consequent risk of an unsafe or weakened fabricated assembly.

Some pins comprise a sacrificial tell-tale formation which is designed to be removed or deformed by a correct swaging operation. However, these are relatively small and difficult to see and unsatisfactory for relatively large scale fabrications in which there may be hundreds of swaged fasteners to check. A further factor is that the fasteners may be in relatively inaccessible locations, making close checking difficult.

SUMMARY OF THE INVENTION

According to a first aspect of the present invention, there is provided a swaged fastener, the swaged fastener including a coated collar for location, in use, on a pin,
  a. the coated collar in an unswaged condition comprising a substrate material having a substrate colour and an indicator material having an indicator colour,
  b. the indicator material being located on the substrate material, the indicator colour being visually different to the substrate colour,
  c. the coated collar including a swaging surface, to which, in use, a swaging force is applied to move the collar from the unswaged condition to a swaged condition,
  d. the indicator material comprising at least part of the swaging surface and being arranged so that, in a correctly swaged condition when the swaging process has been correctly carried out, the indicator material comprising the swaging surface is substantially removed to expose the substrate colour and thereby provide a visual indication that the swaging process has been correctly carried out.

Possibly, the coated collar includes a body and a flange, the flange being located at one end of the body. Possibly, the collar defines a plain (unthreaded) bore, which, in use, receives the pin therethrough.

Possibly, the body includes a collar body lateral surface, which may comprise the swaging surface.

Possibly, the indicator material comprises at least part of the collar body lateral surface.

Possibly, the coated collar has a longitudinal axis.

Possibly, the swaging surface is laterally (sidewardly) outwardly directed relative to the longitudinal axis.

Possibly, the collar body lateral surface is laterally (sidewardly) outwardly directed relative to the longitudinal axis.

Possibly, the indicator material comprises a coloured dye or pigment.

Possibly, the colour of the indicator material is red and the dye or pigment is red.

The dye may comprise eosin. The pigment may comprise iron oxide.

Possibly, the substrate material has a self-colour, which may be the substrate colour. Possibly, the substrate material is a metal and the self-colour may be grey.

Possibly, the indicator material is located on a portion of the swaging surface. The portion may be a band which extends continuously around the swaging surface. The portion may be a patch or spot which does not extend continuously around the swaging surface. Possibly, the indicator material is located on substantially the whole of the swaging surface. Possibly, the indicator material is located on all surfaces of the coated collar.

Possibly, the indicator material is formed by a process in which a coating liquid is formed. The coating liquid may comprise an ink, which may comprise the coloured dye or pigment. The ink may comprise a carrier liquid, which may comprise an alcohol and may comprise propan-1-ol. The carrier liquid may comprise a resin, which may be non-polar. The ink may be a marker pen ink and may be a permanent marker pen ink.

The coating liquid may comprise a diluent, which may comprise an alcohol, and may comprise propan-1-ol. Possibly, the diluent comprises substantially only propan-1-ol.

The coating liquid may comprise the ink and the diluent in a ratio of ink:diluent by volume of no less than 2:1, possibly no less that 2.5:1, possibly no more than 4:1, and possibly no more than 3.5:1.

Possibly, the indicator material is located on the substrate material by application of the coating liquid to the uncoated collar to form a wet coated collar.

Possibly, the wet coated collar is heated, and may be heated in an oven. Possibly, the wet coated collar is heated for a heating time. Possibly, the heating time is at least 60 minutes and possibly at least 70 minutes, and may no more than 90 minutes and possibly no more than 80 minutes.

Possibly, the wet coated collar is heated at a heating temperature. Possibly, the hating temperature is at least 60° C. and possibly at least 70° C., and may be no more than 90° C. and possibly no more than 80° C.

Possibly, the swaged fastener comprises the pin. Possibly, in use, the coated collar is fixed to the pin by the swaging process.

Possibly, the pin is a lockbolt. Possibly, the swaged fastener is a lockbolt fastener.

According to a second aspect of the present invention, there is provided a method of forming a swaged fastener, the swaged fastener including a coated collar for location in use on a pin,
  a. the coated collar in an unswaged condition comprising a substrate material having a substrate colour and an indicator material having an indicator colour,
  b. the indicator material being located on the substrate material, the indicator colour being visually different to the substrate colour, c. the coated collar including a swaging surface, to which, in use, a swaging force is applied to move the collar from the unswaged condition to the swaged condition, d. the indicator material comprising at least part of the swaging surface and being arranged so that, in a swaged condition when the swaging process has been correctly carried out, the indicator material comprising the swaging surface is substantially removed to expose the substrate colour and thereby provide a visual indication that the swaging process has been correctly carried out.

According to a third aspect of the present invention, there is provided a method of fastening, the method including providing a swaged fastener, the swaged fastener including a coated collar for location in use on a pin, a. the coated collar in an unswaged condition comprising a substrate material having a substrate colour and an indicator material having an indicator colour, b. the indicator material being located on the substrate material, the indicator colour being visually different to the substrate colour, c. the coated collar including a swaging surface, to which, in use, a swaging force is applied to move the collar from the unswaged condition to the swaged condition, d. the indicator material comprising at least part of the swaging surface and being arranged so that, in a swaged condition when the swaging process has been correctly carried out, the indicator material comprising the swaging surface is substantially removed to expose the substrate colour and thereby provide a visual indication that the swaging process has been correctly carried out.

Possibly, the swaged fastener includes any of the features described in any of the preceding statements or following description. Possibly, the method includes any of the steps described in any of the preceding statements or following description.

BRIEF DESCRIPTION OF THE DRAWINGS

Embodiments of the present invention will now be described, by way of example only, and with reference to the accompanying drawings, in which:—

FIGS. 1A to 1C are, respectively, a schematic side view of a swaged fastener pin, a schematic cross section of a coated collar and a schematic side view of the coated collar;

FIGS. 2A and 2B are, respectively, schematic part cross-sectional side views of a swaged fastener in use in an unswaged condition and in a correctly swaged condition;

FIGS. 3A and 3B are, respectively, schematic part cross-sectional side views of another swaged fastener in use in an unswaged condition and in a correctly swaged condition;

FIG. 4 is a schematic part cross-sectional side view of the swaged fastener of FIG. 3A in a partially (incorrectly) swaged condition.

Figure 5:
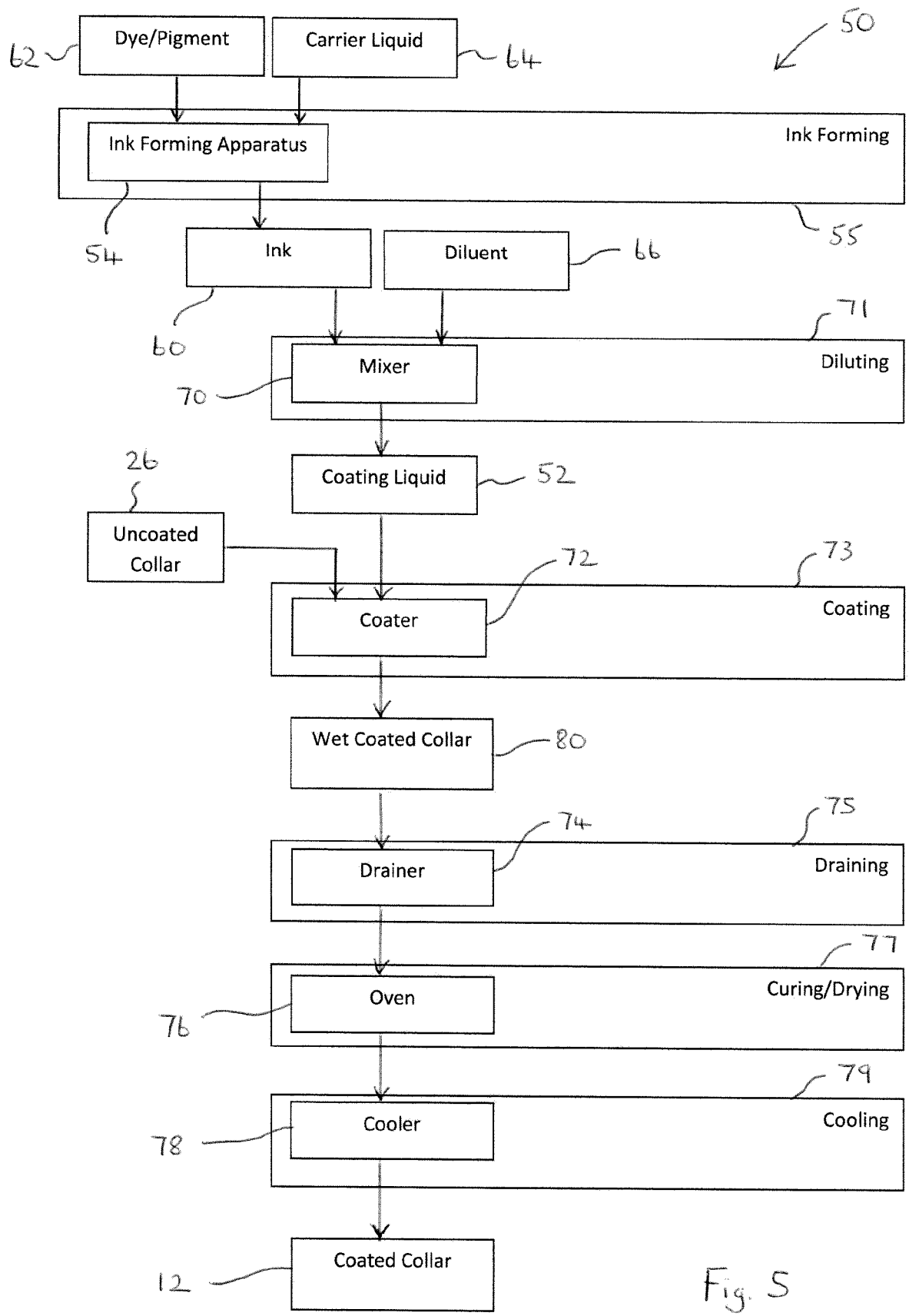
FIG. 5 is a diagram showing steps in a method of forming the coated collar.

In the drawings, where multiple instances of the same or similar features exist, only a representative one or some of the instances of the features have been provided with numeric references for clarity.

DETAILED DESCRIPTION OF THE PREFERRED EMBODIMENTS

FIGS. 1 and 2 show a swaged fastener 10, the swaged fastener 10 including a coated collar 12 for location in use on a pin 14. In an unswaged condition, the coated collar 12 comprises a substrate material 16 having a substrate colour and an indicator material 20 having an indicator colour. The indicator material 20 is located on the substrate material 16. The indicator colour is visually different to the substrate colour.

The coated collar 12 includes a swaging surface 18 to which, in use, a swaging force is applied to move the collar 12 from the unswaged condition to a swaged condition.

The indicator material 20 comprises at least part of the swaging surface 18 and is arranged so that, in a correctly swaged condition, the indicator material 20 comprising the swaging surface 18 is substantially removed to expose the substrate colour and thereby provide a visual indication that the swaging process has been correctly carried out.

The swaged fastener 10 comprises the pin 14.

In the example shown, the pin 14 is a lockbolt and the swaged fastener 10 is a lockbolt fastener.

The pin 14 comprises a head 40, a body 42 and a tail 46. The body 42 includes body groove formations 44 which could be threaded, annular or a combination thereof. The tail 46 includes tail groove formations 48 which could be threaded or annular.

The coated collar 12 includes a body 30 and a flange 32. The flange 32 is located at one end of the body 30 and has an enlarged diameter relative to the body 30. The coated collar 12 defines a plain (unthreaded) bore 34, which, in use, receives the pin body 42 therethrough.

The body 30 includes a collar body lateral surface 36 which comprises the swaging surface 18.

The indicator material 20 comprises at least part of the collar body lateral surface 36.

The coated collar 12 has a longitudinal axis 22.

The swaging surface 18 (and the collar body lateral surface 36) is laterally (sidewardly) outwardly directed relative to the longitudinal axis 22.

The indicator material 20 comprises a coloured dye or pigment 62.

In one example, the colour of the indicator material 20 is red and the dye or pigment 62 is red.

The substrate material 16 has a self-colour, which is the substrate colour. In one example, the substrate material 16 is a metal and the self-colour is grey. In one example, the substrate material 16 could a grey zinc plated carbon steel.

The indicator material 20 could be located on a portion 28 of the swaging surface 18. In one example, as shown in FIGS. 1C and 2A, the portion 28 is a band 24 which extends continuously around the swaging surface 18. In other examples (not shown) the portion 28 could be a patch or spot which does not extend continuously around the swaging surface 18.

In Use

FIGS. 2A and 2B show the swaged fastener 10 in use, being used to fasten two items 56 together. In one example, the items 56 are formed of metal. The pin 14 is located through holes 58 defined by the items 56 and the coated collar 12 is located on the pin body 42 so that the pin body 42 passes through the bore 34.

A swaging tool 38 grips the tail groove formations 48 and moves along the longitudinal fixing axis 22 so that forming surfaces 68 move along and over the swaging surface 18, applying a swaging force thereto which compresses the coated collar 12 into the body groove formations 44, moving the coated collar 12 to the swaged condition as shown in FIG. 2B. The swaging force reduces the diameter of the swaging surface 18.

When correctly carried out the forming surfaces 68 move over substantially the whole of the collar body lateral surface 36 and the swaging surface 18 to the collar flange 32.

The movement and pressure of the forming surfaces 68 on the swaging surface 18 removes the indicator material 20 from the swaging surface 18, exposing the grey self-colour substrate material 16 to be seen on the swaging surface 18 and the collar body lateral surface 36.

Advantageously, the change in colour of the collar body lateral surface 36 from red to grey enables easy checking and identification of the swaged fasteners 10 for which the swaging process has been correctly carried out and permits those swaged fasteners 10 for which the swaging process has not been carried out to be easily identified.

Advantageously, the checking does not require close examination, since the change in colour of the swaging surface 18 is apparent from a distance and can be observed even if the swaged fastener 10 is relatively inaccessible.

FIGS. 3A, 3B and 4 show another embodiment of the invention, many features of which are similar to those already described in relation to the embodiment of FIGS. 1A, 1B, 1C, 2A and 2B. Therefore, for the sake of brevity, the following embodiment will only be described in so far as it differs from the embodiment already described. Where features are the same or similar, the same reference numerals have been used and the features will not be described again.

In the embodiment of FIGS. 3 and 4, the indicator material 20 is located over substantially the whole of the swaging surface 18. Advantageously, the greater area of the indicator material 20 means that there is a greater difference in visual appearance between the coated collar 12 in an unswaged condition and the correctly swaged condition.

A further advantage is shown in FIG. 4 in which the forming surfaces 68 of the swaging tool 38 have only travelled partway along the collar body lateral surface 36 so that the swaging process is incomplete. The part of the collar body lateral surface 36 which has not been swaged is still visually apparent as coloured red, providing an indication that the swaging process has not been correctly carried out.

In the embodiment of FIGS. 3 and 4, the indicator material 20 could be located on all of the surfaces (both internal and external) of the collar 12. FIG. 5 shows a process 50 for locating the indicator material 20 on all of the surfaces of the collar 12.

Referring to FIG. 5, the process 50 comprises an ink forming step 55 in which a coloured dye or pigment 62 and a carrier liquid 64 are added to ink forming apparatus 54 to form an ink 60.

In one example, the carrier liquid 64 could comprise an alcohol and could more specifically comprise propan-1-ol.

The dye could comprise eosin. The pigment could comprise iron oxide.

The carrier liquid 64 could comprise a resin, which could be non-polar.

The ink 60 could be a marker pen ink and could be a permanent marker pen ink.

Following the ink forming step 55, the process 50 comprises a diluting step 71 in which the ink 60 and a diluent 66 are added to a mixer 70 to form a coating liquid 52.

In one example, the diluent 66 could comprise an alcohol, and could more specifically comprise propan-1-ol. Optimally, the diluent 66 could comprise substantially only propan-1-ol.

In one example, the coating liquid 52 could comprise the ink 60 and the diluent 66 in a ratio of ink:diluent by volume no less than 2:1 and desirably no less than 2.5:1. In other examples, the ink:diluent ratio could be no more than 4:1 and desirably no more than 3.5:1.

In one example, the ink:diluent ratio could be optimally 3:1.

Following the diluting step 71, the process 50 comprises a coating step 73 in which the coating liquid 52 is applied to an uncoated collar 26 to form a wet coated collar 80.

The coating liquid 52 could be applied to the uncoated collar 26 in a coater 72.

The coater 72 could comprise a rotating drum and the coating liquid 52 could be applied by tumbling the uncoated collar 26 in the coating liquid 52 in the drum, so that the uncoated collar 26 is coated on all of its surfaces.

In other examples, the coating liquid 52 could be applied by painting, spraying, dipping, brushing or any other suitable method.

Following the coating step 73, the process 50 comprises a draining step 75 in which the wet coated collar 80 is drained of excess coating liquid in, for example, a drainer 74.

Following the draining step 75, the process 50 comprises a curing/drying step 77 in which the wet coated collar 80 is heated in an oven 76 to form the coated collar 12.

In one example, the wet coated collar 80 could be heated for a heating time. The heating time could be at least 60 minutes and desirably could be at least 70 minutes. In one example, the heating time could be no more than 90 minutes and desirably could be no more than 80 minutes.

In one example, the wet coated collar 80 could be heated at a heating temperature. The heating temperature could be at least 65° C. and desirably could be at least 75° C. In one example, the heating temperature could be no more than 95° C. and desirably no more than 85° C.

In a particular example, the wet coated collar 80 is heated at 80° C. for 75 minutes.

Following the curing/drying step 77, the process 50 comprises a cooling step 79 in which the hot coated collar 12 is allowed to cool in, for example a cooler 78. Advantageously, the relatively low temperature of the curing/drying step 77 means that only a relatively short time is required for the collar 12 to cool adequately before packing or use.

The Applicant has found that when processed at these conditions, the indicator material 20 on the cooled coated collar 12 remains slightly sticky or tacky, but not so that the collar 12 adheres to other collars 12 or to other items.

In use, the Applicant has found that the process 50 using the relatively dilute coating liquid 52 produces the indicator material 20 which has sufficient colour depth/intensity to produce the visual indication required, but without detrimental staining or colour contamination of the swaging tool 38.

Other Modifications

Various other modifications could be made without departing from the scope of the invention. The pin, the collar and the indicator material could be of any suitable size and shape, and could be formed of any suitable material (within the scope of the specific definitions herein).

The pin 14 could be of any suitable type. In one example, the pin 14 is a lockbolt and could comprise a "bobtail" or "pintail" pin. In some examples, the pin 14 could comprise a tail which breaks away during installation, for example, a "pintail" pin. In other examples, the pin 14 could comprise a tail which remains in place after installation, for example, a "bobtail" pin.

In other examples, the swaged fastener could comprise any fastener which is fastened by swaging. For example, certain blind fasteners are fastened by swaging.

In some examples, the collar 12 could be of a different shape, and could be flangeless, eg a so-called "standard" collar.

The substrate material 16 could comprise a surface finish (not shown), to which the coating liquid 52 is applied. The surface finish could comprise an anti-corrosion material and/or a lubricating material. The anti-corrosion material could comprise zinc plating. The lubricating material could comprise wax. In the swaging operation, the surface finish could be partially or wholly removed.

The substrate material could be a different colour to grey. The indicator material could be a different colour to red.

Any of the features or steps of any of the embodiments shown or described could be combined in any suitable way, within the scope of the overall disclosure of this document.

There is thus provided a swaged fastener with a number of advantages over conventional arrangements. In particular, the swaged fasteners of the invention include a collar which is marked with an indicator material which is removed by correct swaging and thus permits easy checking and identification of correctly swaged fasteners and incorrectly swaged fasteners. The checking does not require close examination or touching and can be undertaken by relatively unskilled operatives.

What is claimed is:

1. A fastener comprising:
   a collar having a swaging surface made of a substrate material having a substrate colour; and
   an indicator material having an indicator colour coated on at least part of the substrate material of the swaging surface, the indicator colour being visually different from the substrate colour,
   wherein the coated collar is adapted to be swaged to move the collar from the unswaged condition to a swaged condition,
   wherein the indicator material is adapted so that, in a correctly swaged condition when the swaging process has been correctly carried out, the indicator material is substantially removed to expose the substrate colour and thereby provide a visual indication that the swaging process has been correctly carried out.

2. The fastener according to claim 1, in which the coated collar includes a body and a flange, the flange being located at one end of the body, the body including a collar body lateral surface, which comprises the swaging surface, and the indicator material comprises at least part of the collar body lateral surface.

3. The fastener according to claim 1, in which the coated collar has a longitudinal axis, and the swaging surface is laterally outwardly directed relative to the longitudinal axis.

4. The fastener according to claim 1, in which the indicator material comprises a coloured dye or pigment.

5. The fastener according to claim 4, in which the colour of the indicator material is red.

6. The fastener according to claim 4, in which the indicator material comprises an eosin coloured dye or an iron oxide pigment.

7. The fastener according to claim 1, in which the substrate material has a self-colour, wherein the substrate material is a metal and the self-colour is grey.

8. The fastener according to claim 1, in which the indicator material is located on a portion of the swaging surface; the portion is a band which extends continuously around the swaging surface, or a patch or spot which does not extend continuously around the swaging surface.

9. The fastener according to claim 1, in which the indicator material is located on substantially the whole of the swaging surface.

10. The fastener according to claim 1, in which the indicator material is formed by a process in which a coating liquid is formed; the coating liquid comprising an ink, which comprises the coloured dye or pigment.

11. The fastener according to claim 10, in which the ink comprises a carrier liquid, which comprises an alcohol; the carrier liquid comprises a resin, which is non-polar.

12. The fastener according to claim 10, in which the ink is a marker pen ink.

13. The fastener according to claim 10, in which the coating liquid comprises a diluent, which comprises an alcohol.

14. The fastener according to claim 10, in which the coating liquid comprises a diluent, and the coating liquid comprises the ink and the diluent in a ratio of ink:diluent by volume of no less than 2:1, and no more than 4:1.

15. The fastener according to claim 10, in which the coating liquid comprises a diluent, and the coating liquid comprises the ink and the diluent in a ratio of ink:diluent by volume of no less than 2:1 and no more than 3.5:1.

16. The fastener according to claim 10, in which the coating liquid comprises a diluent, and the coating liquid comprises the ink and the diluent in a ratio of ink:diluent by volume of no less than 2.5:1 and no more than 4:1.

17. The fastener according to claim 10, in which the coating liquid comprises a diluent, and the coating liquid comprises the ink and the diluent in a ratio of ink:diluent by volume of no less than 2.5:1 and no more than 3.5:1.

18. The fastener according to claim 10, in which the ink comprises a carrier liquid, which comprises an alcohol which comprises propan-1-ol.

19. The fastener according to claim 10, in which the coating liquid comprises a diluent, which comprises an alcohol, which comprises propan-1-ol.

20. The fastener according to claim 1, in which the indicator material is formed by a process in which coating liquid is formed; the coating liquid comprising an ink, which comprises the coloured dye or pigment; and the indicator material is located on the substrate material by application of the coating liquid to the uncoated collar to form a wet coated collar; wherein following coating, the wet coated collar is heated for a heating time; the heating time is at least 60 minutes and no more than 90 minutes.

21. The fastener according to claim 1, in which the indicator material is formed by a process in which a coating liquid is formed; the coating liquid comprising an ink, which comprises a coloured dye or a pigment and the indicator material is located on the substrate material by application of the coating liquid to the uncoated collar to form a wet coated collar; wherein following coating, the wet coated collar is heated at a heating temperature; the heating temperature is at least 60° C. and is no more than 90° C.

22. The fastener according to claim 1, in which the swaged fastener is a lockbolt fastener configured, in use, to be installed on a lockbolt.

* * * * *